(12) United States Patent
Nakamura et al.

(10) Patent No.: US 8,469,328 B2
(45) Date of Patent: Jun. 25, 2013

(54) LOCK MECHANISM FOR SEAT TRACK SLIDE DEVICE

(75) Inventors: Motohisa Nakamura, Kakamigahara (JP); Takayuki Ogasawara, Kakamigahara (JP)

(73) Assignee: Gifu Auto Body Co., Ltd. (JP)

( * ) Notice: Subject to any disclaimer, the term of this patent is extended or adjusted under 35 U.S.C. 154(b) by 87 days.

(21) Appl. No.: 13/034,134

(22) Filed: Feb. 24, 2011

(65) Prior Publication Data

US 2012/0132778 A1 May 31, 2012

(30) Foreign Application Priority Data

Nov. 25, 2010 (JP) .................................. 2010-262659

(51) Int. Cl.
*F16M 13/00* (2006.01)
*A47C 1/00* (2006.01)

(52) U.S. Cl.
USPC .......................... 248/430; 248/424; 297/344.1

(58) Field of Classification Search
USPC .......... 248/424, 429, 430, 420, 423; 297/318, 297/341, 344.1, 473
See application file for complete search history.

(56) References Cited

U.S. PATENT DOCUMENTS

| 5,028,028 | A | * | 7/1991 | Yamada et al. | 248/430 |
| 5,167,393 | A | * | 12/1992 | Hayakawa et al. | 248/430 |
| 6,286,799 | B1 | * | 9/2001 | Fujii | 248/430 |
| 6,305,746 | B1 | * | 10/2001 | Ikegaya et al. | 297/344.1 |
| 2008/0048476 | A1 | * | 2/2008 | Kojima et al. | 297/341 |
| 2009/0032670 | A1 | | 2/2009 | Yoshida et al. | |
| 2012/0132777 | A1 | * | 5/2012 | Nakamura et al. | 248/429 |
| 2012/0132778 | A1 | * | 5/2012 | Nakamura et al. | 248/429 |

FOREIGN PATENT DOCUMENTS

| JP | 2005-225386 | 8/2005 |
| JP | 2006-315531 | 11/2006 |
| JP | 2010-030461 | 2/2010 |
| JP | 2010-100077 | 5/2010 |

* cited by examiner

*Primary Examiner* — Tan Le
(74) *Attorney, Agent, or Firm* — Caesar, Rivise, Bernstein, Cohen & Pokotilow, Ltd.

(57) ABSTRACT

A seat track slide device includes a pair of seat tracks. Each seat track has a lower rail, an upper rail, a lock lever, and a handle and is capable of switching the associated upper rail to locking and unlocking states by selectively engaging and disengaging the lever with respect to the lower rail. Each lever is inserted into the corresponding upper rail and pivotally supported in the upper rail. An interlock support portion of the lever projects into an outer zone with respect to the front end of the upper rail. The interlock support portion of the lock lever supports an interlock support portion of the handle pivotally relative to each other. With the lever maintained in the locking state, the handle is allowed to pivot relative to the lever in the outer zone with respect to the front end of the upper rail against elastic force produced by a torsion coil spring arranged in the upper rail.

7 Claims, 6 Drawing Sheets

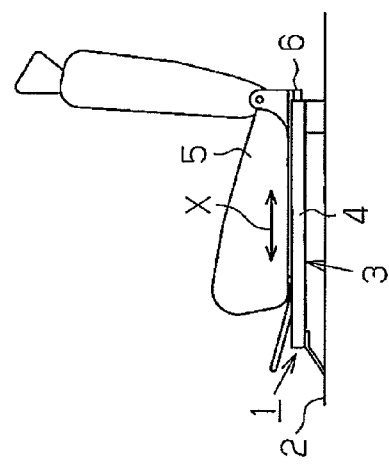
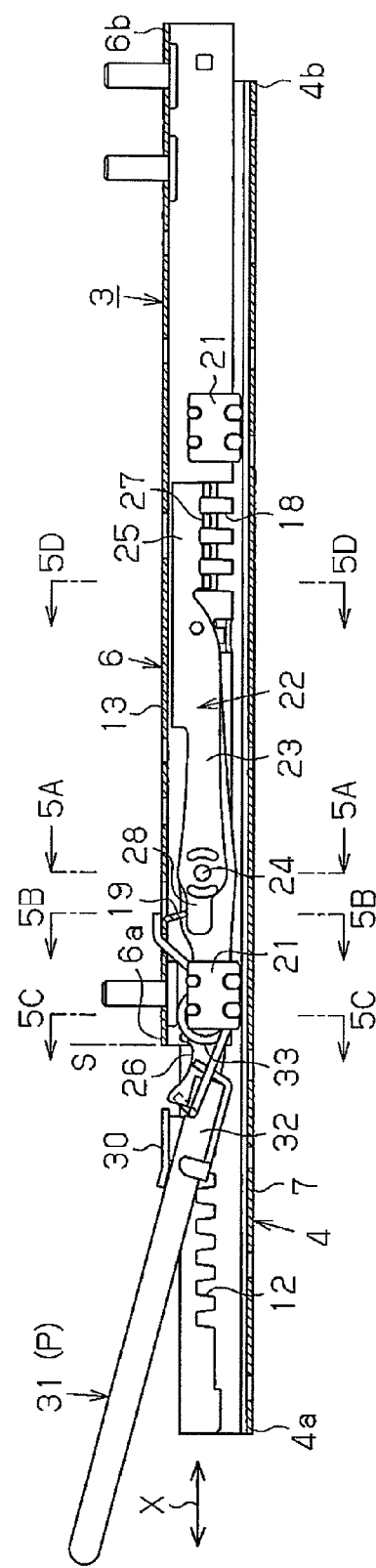

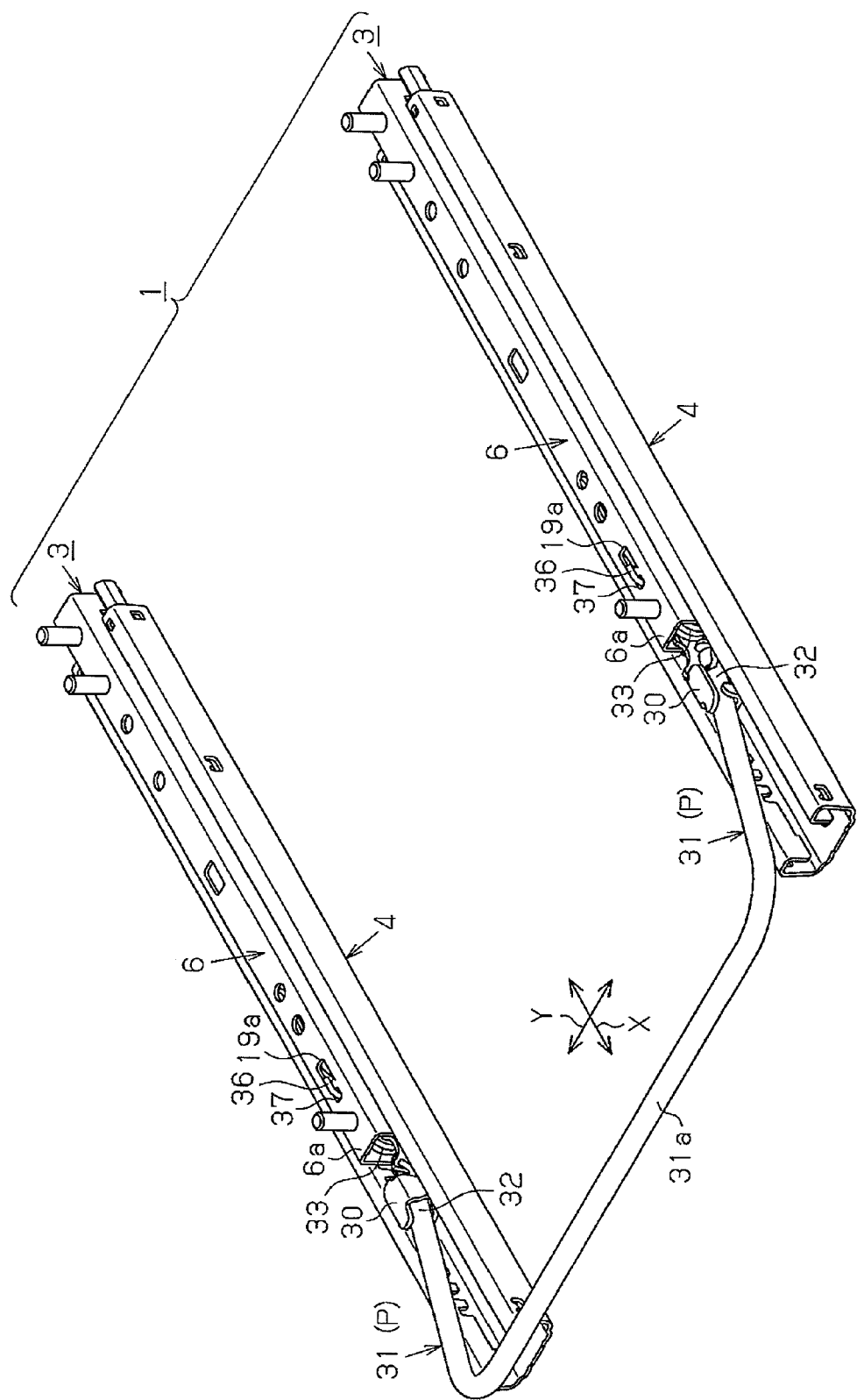

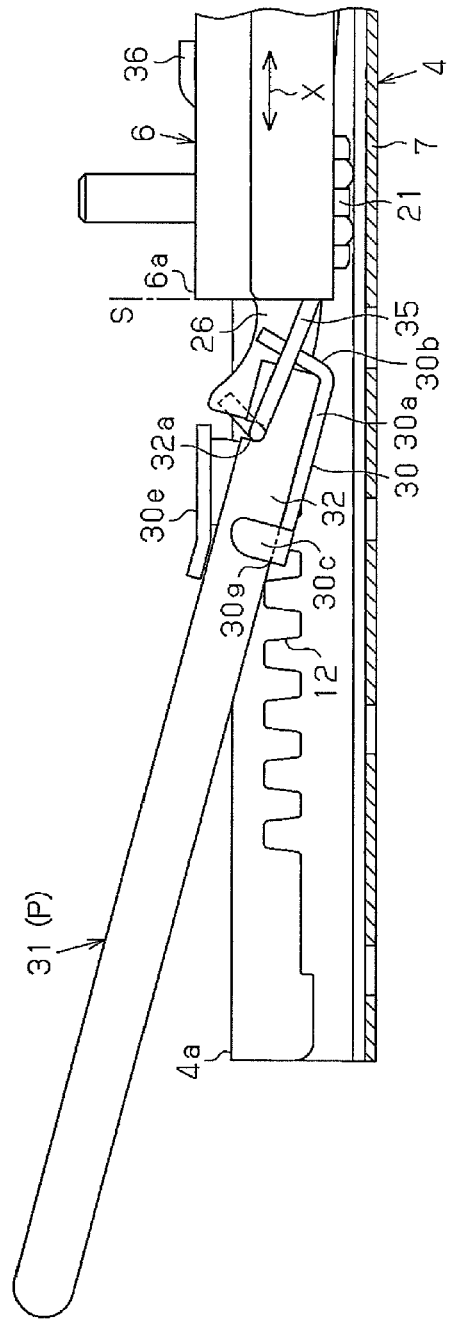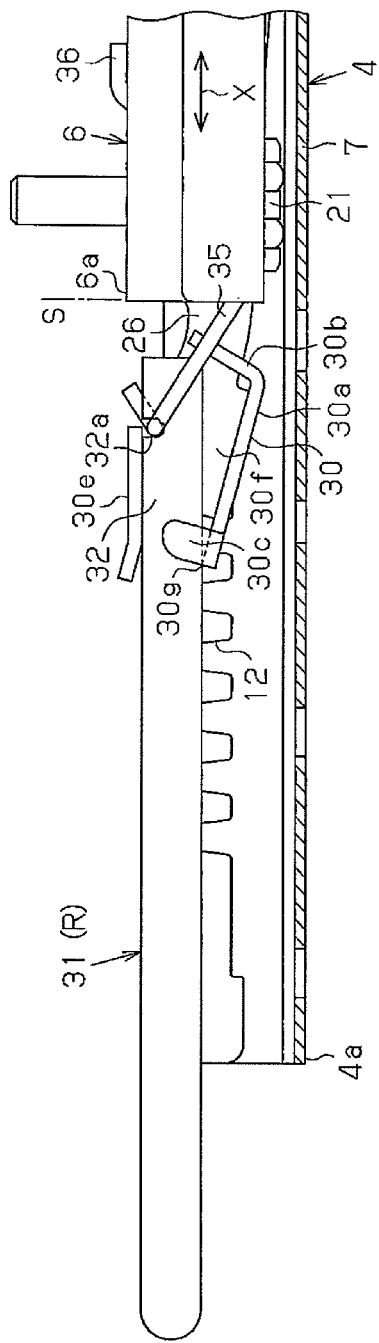

LOCK MECHANISM FOR SEAT TRACK SLIDE DEVICE

BACKGROUND OF THE INVENTION

The present invention relates to a seat track slide device for a vehicle and, specifically, a lock mechanism for selectively restricting and permitting movement of an upper rail relative to a lower rail.

A conventional lock mechanism for a seat track slide device is disclosed in, for example, Japanese Laid-Open Patent Publication No. 2005-225386. The lock mechanism includes a pair of lower rails, a pair of upper rails, and a pair of lock levers. The lower rails are fixed to the floor and the upper rails are slidable on the corresponding lower rails. Each of the lock levers is accommodated in the corresponding one of the upper rails. Each lock lever is pivotally supported by a support shaft in the corresponding upper rail. The lock levers are connected to each other through a handle. Each end of the handle is inserted into the corresponding upper rail from the front end of the upper rail and connected to the front end of the associated lock lever in the upper rail by means of an interlock support portion. Being interlocked by manipulation of the handle, the lock lever is selectively engaged with and disengaged from a lock hole of the corresponding lower rail.

Typically, movement allowance is ensured for each of the interlock support portions, which are arranged between the corresponding ends of the handle and the front ends of the associated lock lever. This allows the handle to pivot relative to each lock lever by an amount corresponding to the movement allowance with the lock levers maintaining their locking states, when the seat track slide device receives force inadvertently due to, for example, a car collision.

In the conventional lock mechanism, each end of the handle, which is inserted into the corresponding upper rail from the front end of the upper rail, is connected to the front end of the associated lock lever in the upper rail through the interlock support portion. This easily causes contact between the handle and the upper rails when the handle pivots relative to the lock levers, thus limiting the range in each upper rail that allows the handle and the associated lock lever to pivot relative to each other. As a result, the lock levers are prevented from sufficiently exerting their unlocking prevention functions.

SUMMARY OF THE INVENTION

Accordingly, it is an objective of the present invention to provide a lock mechanism for a seat track slide device that has an enlarged relative pivoting range of a lock member and a handle in an interlock support portion, which is arranged between the lock member and the handle, and improves the unlocking prevention function of the lock member.

To achieve the foregoing objective and in accordance with one aspect of the present invention, a lock mechanism for a seat track slide device is provided that is arranged between a floor and a seat in a vehicle and selectively restricts and permits sliding of the seat. The lock mechanism includes a pair of lower rails, a pair of upper rails, a plurality of lock portions, a lock member, a handle, an interlock support portion, a fulcrum portion, and a spring. The lower rails are configured by a first lower rail and a second lower rail fixed to the floor. The upper rails are configured by a first upper rail and a second upper rail that are fixed to the seat and supported to be movable with respect to the first lower rail and the second lower rail, respectively. The lock portions are formed in at least the first lower rail out of the first and second lower rails. The lock portions are aligned in a movement direction of the corresponding upper rail. The lock member is attached to at least the first upper rail out of the first and second upper rails. The lock member has an end. The handle is attached to the lock member and has an end. The interlock support portion is formed at the end of the lock member and supports the end of the handle. The fulcrum portion is arranged in the interlock support portion of the lock member and pivotally supports the handle. The end of the handle is supported by the interlock support portion of the lock member. The spring is supported between the first upper rail and the end of the handle. As the handle is manipulated, the lock member is selectively engaged with and disengaged from the lock portion of at least the first lower rail. The first upper rail has an end. At least a part of the interlock support portion of the lock member is exposed in an outer zone with respect to the end of the first upper rail and extending along a movement direction of the first upper rail with respect to the end of the first upper rail. The lock member is caused to be interlocked with the handle by an elastic force produced by the spring to be selectively engaged with and disengaged from the lock portion of at least the first lower rail. With at least the first upper rail and at least the first lower rail being locked by the lock member, the end of the handle is allowed to pivot relative to the lock member against the elastic force of the spring about the fulcrum portion of the interlock support portion in the outer zone with respect to the end of the first upper rail.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(a) is a side view schematically showing a seat arranged on a floor of a vehicle with a seat track slide device;

FIG. 1(b) is a cross-sectional side view illustrating the seat track slide device shown in FIG. 1(a) as a whole;

FIG. 2 is a perspective view showing the seat track slide device as a whole;

FIG. 6(a) is a cross-sectional side view showing a part of the seat track slide device in a normal state; and FIG. 6(b) is a cross-sectional side view showing the part of the seat track slide device in an unusual state.

DETAILED DESCRIPTION OF THE PREFERRED EMBODIMENTS

Figure 3:
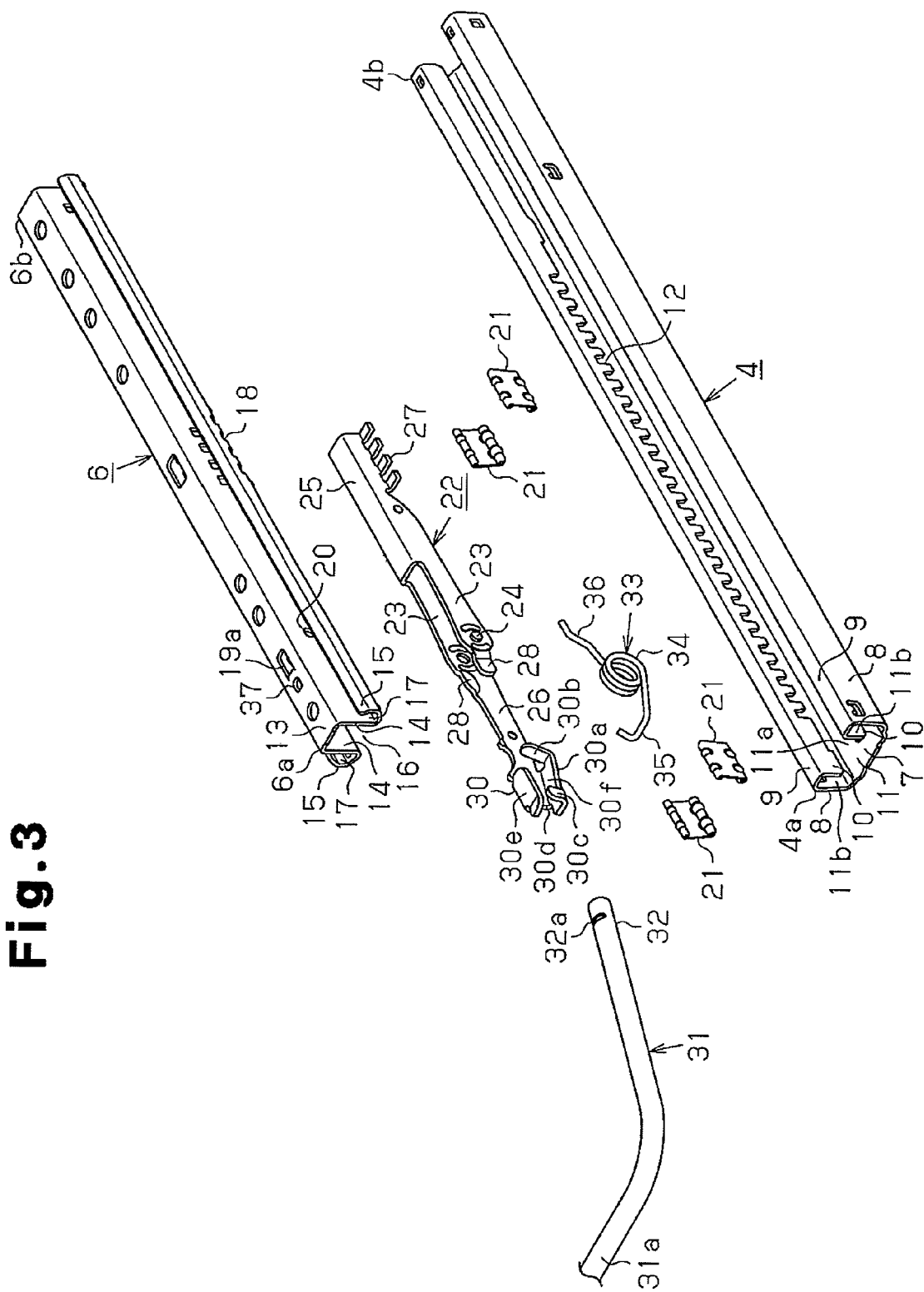
FIG. 3 is an exploded perspective view showing one seat track of the seat track slide device.

A lock mechanism for a seat track slide device according to one embodiment of the present invention will now be described with the attached drawings.

As schematically shown in FIG. 1(a), a seat track slide device 1 is attached to a floor 2 of a vehicle and has a pair of seat tracks 3, which extend in the fore-and-aft directions X. The two seat tracks 3 are spaced from each other in the direction perpendicular to the fore-and-aft directions X, or, in other words, the widthwise direction of the vehicle. The seat tracks 3 are arranged in correspondence with both sides of a seat 5. Each of the seat tracks 3 includes a lower rail 4 and an upper rail 6. The lower rails 4 are fixed to the floor 2. Each of the upper rails 6, which is fixed to the corresponding one of the two sides of the seat 5, is inserted into the corresponding one of the lower rails 4 and supported to be movable in the fore-and-aft directions X.

FIG. 2 shows the seat track slide device 1 as a whole. With reference to FIG. 3 and FIGS. 5(a) to 5(d), the lower rail 4 of each seat track 3 extends in the fore-and-aft directions X between a front end 4a and a rear end 4b. Each of the lower rails 4 includes a bottom plate 7, a pair of side plates 8, a pair of top plates 9, and a pair of end plates 10. The two side plates 8 are bent upward from both sides of the bottom plate 7. The two top plates 9 are bent inward facing each other, from the upper ends of the corresponding side plates 8 and extend in the widthwise direction Y, which is perpendicular to the fore-and-aft direction, or, in other words, the movement direction of each upper rail 6. The two end plates 10 are bent downward from the corresponding top plates 9. The bottom plate 7, the side plates 8, the top plates 9, and the end plates 10 define an accommodation chamber 11. The accommodation chamber 11 has an opening 11a and a pair of grooves 11b. The opening 11a is formed between the end plates 10 and extends in the fore-and-aft directions X. Each of the grooves 11b is formed between the corresponding one of the side plates 8 and the corresponding one of the end plates 10, extending in the fore-and-aft directions X. The accommodation chamber 11 opens upward at the opening 11a and opens in the fore-and-aft directions X at the front end 4a and the rear end 4b. Each end plate 10 has a plurality of lock recesses 12 (lock portions), each of which extends upward from the lower end of the end plate 10. The lock recesses 12 are arranged in a prescribed range in the end plate 10 that is closer to the front end 4a and aligned in the fore-and-aft directions X.

As illustrated in FIGS. 3 and 5(a) to 5(d), each upper rail 6 extends in the fore-and-aft directions X between a front end 6a and a rear end 6b. The upper rail 6 has a top plate 13, a pair of side plates 14, and a pair of guide plates 15. The two side plates 14 are bent downward from both sides of the top plate 13 and spaced from each other at a certain interval in the widthwise direction Y. The two guide plates 15 are each bent outward from the lower end of the corresponding side plate 14 in the widthwise direction Y and project upward. The top plate 13 and the side plates 14 form an accommodation chamber 16. The accommodation chamber 16 opens downward and opens in the fore-and-aft directions X at the front end 6a and the rear end 6b. A groove 17 is formed between each side plate 14 and the associated guide plate 15. The groove 17 opens upward and opens in the fore-and-aft directions X at the front end 6a and the rear end 6b. A plurality of holes 18, which extend upward in each side plate 14 from the lower end of the associated guide plate 15, are formed substantially at a middle position in the side plate 14 and the guide plate 15 and aligned in the fore-and-aft directions X. A stopper plate 19, which is formed by a cutout 19a and supported in a cantilevered manner, is formed in the vicinity of the front end 6a of the top plate 13. The stopper plate 19 is bent downward and received in the accommodation chamber 16, as illustrated in FIG. 4. A support hole 20 is formed in each side plate 14 and in the vicinity of the stopper plate 19.

With reference to FIGS. 1(b), 4(a), 4(b), and 5(a) to 5(d), each upper rail 6 is inserted into the accommodation chamber 11 of the corresponding lower rail 4. The top plate 13 and the side plates 14 of the upper rail 6 project upward from the opening 11a of the accommodation chamber 11. Each side plate 14 faces the corresponding end plate 10 of the lower rail 4. The guide plates 15 of the upper rail 6 are received in the corresponding grooves 11b of the lower rail 4, and the end plates 10 are received in the corresponding grooves 17 of the upper rail 6. In this state, guides 21 are arranged between the two side plates 8 of the lower rail 4 and the corresponding guide plates 15 of the upper rail 6, and engaged with the front ends 4a, 6a and the rear ends 4b, 6b. The guides 21 support the upper rail 6 in a manner movable in the fore-and-aft directions X relatively to the lower rail 4.

In a lock lever 22 (a lock member) of the seat track slide device 1, as illustrated in FIGS. 3 and 5(a) to 5(d), a pair of arm plates 23 extend in the fore-and-aft directions X while being spaced from each other at a certain interval in the widthwise direction Y. Each of the arm plates 23 is arranged adjacent to the corresponding one of the side plates 14 of the upper rail 6. Each arm plate 23 has a projection 24, which projects outward. A support plate 26 extends from one of the arm plates 23 at a position forward from the corresponding projection 24 and adjacent to the corresponding side plate 14 of the upper rail 6. An engageable portion 25, which connects the arm plates 23 together, is formed in the rear end portions of the arm plates 23 at a position rearward from the projections 24. A plurality of lock claws 27 (engagement portions) are formed on both sides of the engageable portion 25 to be aligned in the fore-and-aft directions X. The arm plate 23 having the support plate 26 includes a stopper plate 28, which is formed continuously from the support plate 26 at a position forward from the associated projection 24 and adjacent to the projection 24. The other arm plate 23 has a stopper plate 28 facing the stopper plate 28 of the aforementioned arm plate 23, which is arranged adjacent to the associated projection 24 and extends forward with respect to the projection 24 while supported in a cantilevered manner.

A method for attaching the lock lever 22 to the upper rail 6 will hereafter be described. With reference to FIGS. 1(b), 4(a), 4(b), and 5(a), the lock lever 22 is inserted into the accommodation chamber 16 of the upper rail 6 with the stopper plate 19 of the upper rail 6 in a state before being bent downward. Then, with the two arm plates 23 of the lock lever 22, which are aligned in the widthwise direction Y with respect to the side plates 14 of the upper rail 6, flexed toward each other, the projections 24 of the lock lever 22 are inserted into and engaged with the support holes 20 of the corresponding side plates 14. The stopper plate 19 of the upper rail 6 is then bent downward and received in the space between the two stopper plates 28 of the lock lever 22. In this manner, the projections 24 become pivotally engaged with the corresponding support holes 20. Each of the projections 24 and the corresponding one of the support holes 20 form a pivot support portion 29 (FIG. 5(a)). In each of the pivot support portions 29, engagement between the stopper plates 19, 28 prevents the projection 24 and the support hole 20 from separating from each other in the direction YB (FIG. 5(a)) opposite to the direction YF (FIG. 5(a)) in which the projection 24 and the support hole 20 are engaged with each other. This configuration maintains the support holes 20 and the corresponding projections 24 in engaged states. When the lock lever 22 pivots, the lock claws 27 of the lock lever 22 are selectively engaged with and disengaged from the corresponding lock recesses 12 of the lower rail 4 in the holes 18 of the upper rail 6.

An interlock support portion 30 is formed at the front end of the support plate 26 of the lock lever 22. The interlock support portion 30 projects into an outer zone S, which is located forward from the front end 6a of the upper rail 6. The interlock support portion 30 has a support chamber 30f surrounded by a bottom plate 30a, a rear plate 30b, two side plates 30c, 30d, and a top plate 30e.

Figure 4A:
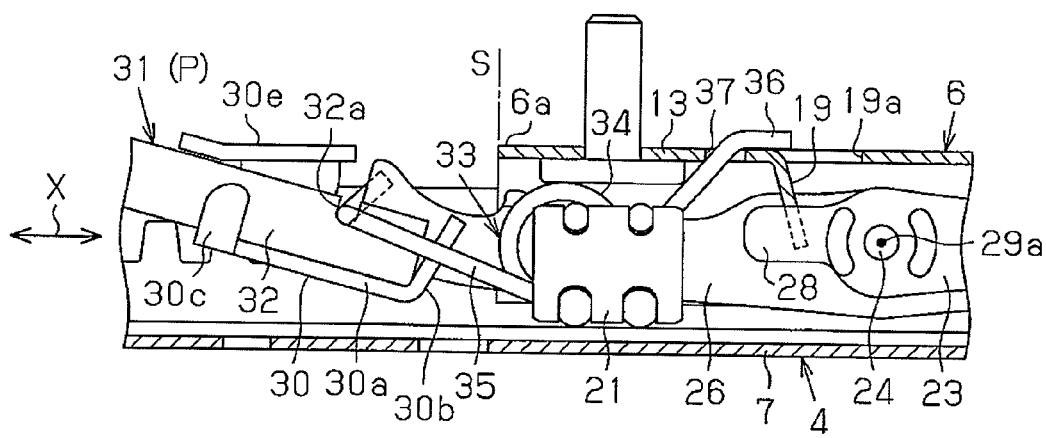
FIG. 4(a) is a cross-sectional side view showing a part of the seat track slide device.
Figure 4B:
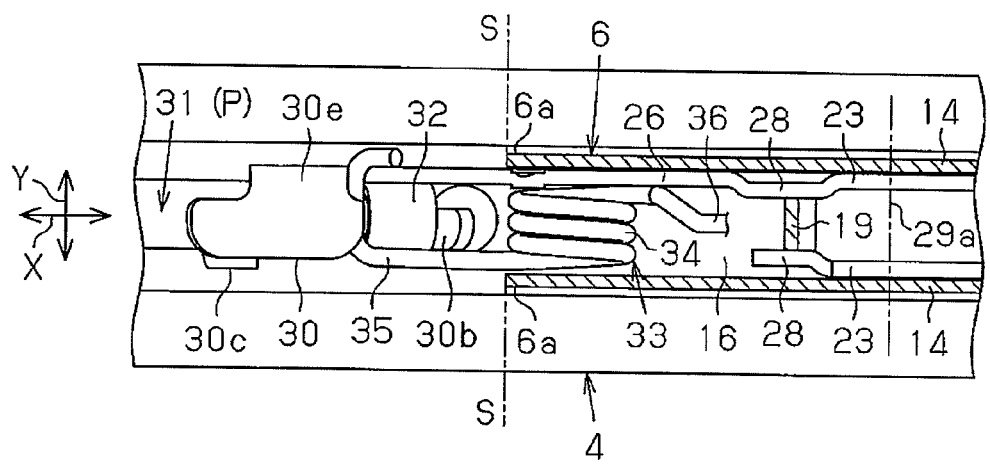
FIG. 4(b) is a cross-sectional view showing the part illustrated in FIG. 4(a), as viewed from above.
Figure 5A:
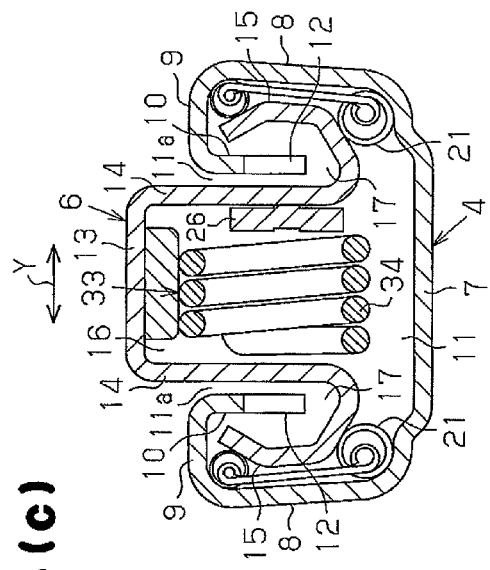
FIG. 5(a) is a cross-sectional view taken along line A-A of FIG. 1(b)
Figure 5C:
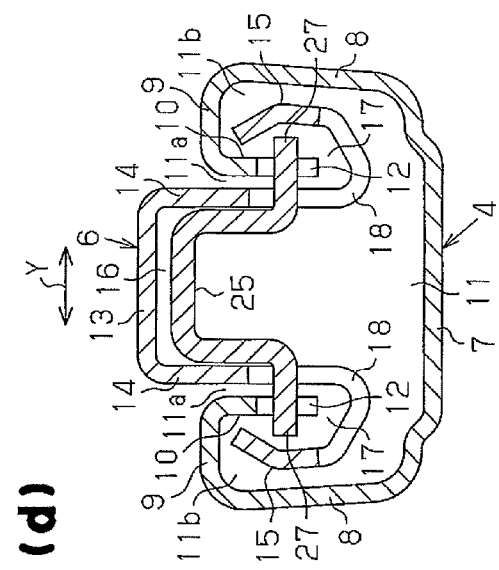
FIG. 5(c) is a cross-sectional view taken along line C-C of FIG. 1(b)
Figure 5B:
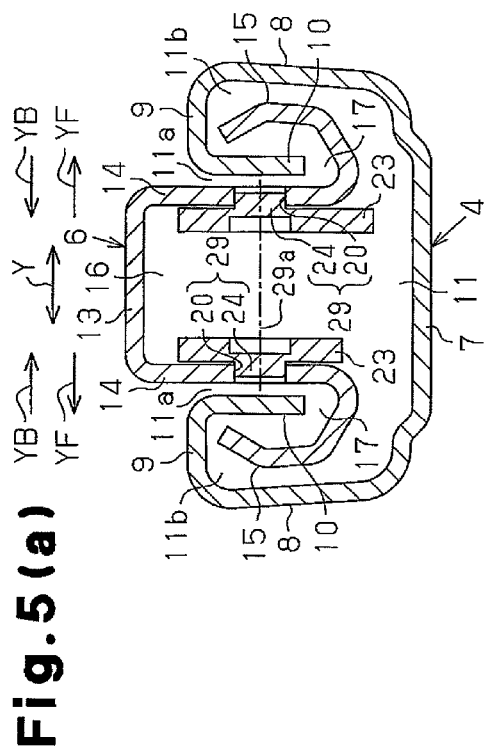
FIG. 5(b) is a cross-sectional view taken along line B-B of FIG. 1(b)
Figure 5D:
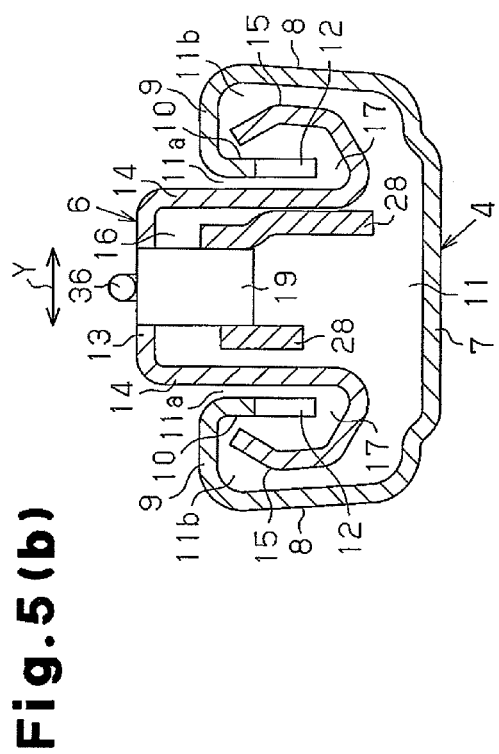
FIG. 5(d) is a cross-sectional view taken along line D-D of FIG. 1(b)

As shown in FIG. 2, a pair of bar-like handles 31 are connected to and interlocked with each other by a connecting portion 31a. With reference to FIG. 4(a), an interlock support portion 32 is arranged in the outer zone S with respect to the front end 6a of each upper rail 6 and formed at the proximal end of each handle 31. Each of the interlock support portions 32 is inserted into the support chamber 30f of the interlock support portion 30 of the corresponding one of the lock levers 22. Each interlock support portion 32 is thus supported by the bottom plate 30a, the rear plate 30b, the side plates 30c, 30d, and the top plate 30e. A hook groove 32a is formed in the outer circumference of the interlock support portion 32 of each handle 31.

A torsion coil spring 33 has a coil portion 34, a first arm portion 35, and a second arm portion 36. The arm portions 35, 36 extend from the coil portion 34. The torsion coil spring 33 is inserted into the accommodation chamber 16 from the front end 6a of each upper rail 6. The coil portion 34 of each torsion coil spring 33 is received in the accommodation chamber 16 at a position in the vicinity of the front end 6a of the corresponding upper rail 6. The coil portion 34 is arranged between the interlock support portion 30 and the two arm plates 23 of the associated lock lever 22 and between the support plate 26 of the lock lever 22 and the corresponding side plate 14 of the upper rail 6 in such a manner as to minimize the gap between the support plate 26 and the side plate 14. The coil portion 34 restricts movement of the lock lever 22 in the widthwise direction Y, thereby preventing deformation of the lock lever 22. The first arm portion 35 of each torsion coil spring 33 projects from the front end 6a of the associated upper rail 6 into the outer zone S with respect to the front end 6a. The first arm portion 35 is thus received in the support chamber 30f of the interlock support portion 30 in the outer zone S and supported by the hook groove 32a of the interlock support portion 32 of the corresponding handle 31. The second arm portion 36 is supported by the top plate 13 of the upper rail 6 by means of the hook hole 37. By positioning the first and second arm portions 35, 36, the torsion coil spring 33 is prevented from moving in the fore-and-aft directions X. Since the coil portion 34 is supported by the top plate 13 of the upper rail 6, elastic force is generated by the first arm portion 35.

The seat track slide device 1 operates in the manner described below.

When each handle 31 is at the lock position P illustrated in FIGS. 1(b), 2, 4(a), and 4(b), the elastic force produced by the torsion coil spring 33 pivots the interlock support portion 32 of the handle 31 downward about a fulcrum portion 30g (FIG. 6(a)), which is the front end of the bottom plate 30a in the support chamber 30f of the interlock support portion 30 of the associated lock lever 22, thus causing contact between the interlock support portion 32 and the bottom plate 30a. This pivots the interlock support portion 30 of the lock lever 22 downward about a pivot axis 29a of the pivot support portion 29 and the engageable portion 25 of the lock lever 22 upward about the pivot axis 29a of the pivot support portion 29, thus switching the lock mechanism to a locking state. The lock claws 27 of the engageable portion 25 are thus engaged with the corresponding lock recesses 12 of the lower rail 4. By raising the handle 31 against the elastic force of the torsion coil spring 33, the handle 31 is lifted from the locking position P to an unlocking position. This causes the interlock support portion 30 of the lock lever 22 to be interlocked with the interlock support portion 32 of the handle 31 and pivot upward about the pivot axis 29a of the pivot support portion 29. The engageable portion 25 of the lock lever 22 thus pivots downward about the pivot axis 29a of the pivot support portion 29, switching the lock mechanism to an unlocking state. As a result, the lock claws 27 of the engageable portion 25 are separated from the lock recesses 12 of the lower rail 4.

If the lower rail 4 and the upper rail 6 of each seat track 3 are twisted relative to each other in a car collision, at least one of the handles 31, which are interlocked with each other, is switched from the lock position P to the impact torsion state R, as illustrated in FIG. 6(b). This pivots the interlock support portion 32 of the handle 31 upward about the fulcrum portion 30g, which is the front end of the bottom plate 30a in the support chamber 30f of the interlock support portion 30 of the lock lever 22, against the elastic force of the torsion coil spring 33. The interlock support portion 32 thus separates from the bottom plate 30a. In this state, pivoting of the handle 31 is not transmitted as pivoting motion to the lock lever 22. As a result, the lock lever 22 is maintained in the locking state.

The illustrated embodiment has the advantages described below.

(1) In the seat track slide device 1, the handles 31 of the seat tracks 3 are interlocked with each other. The fulcrum portion 30g is arranged in the interlock support portion 30 of each lock lever 22 and located in the outer zone S with respect to the front end 6a of the associated upper rail 6. Accordingly, when a car collision occurs, relative pivoting of each handle 31 and the corresponding lock lever 22 is brought about in the outer zone S with respect to the front end 6a of the associated upper rail 6. As a result, contact between the handle 31 and the upper rail 6 is avoided. This enlarges the relative pivoting range of the handle 31 and the lock lever 22, thus improving the locking state maintaining function.

(2) The lock levers 22 are received in the corresponding upper rails 6. The pivot support portions 29 support each lock lever 22 pivotally in the associated upper rail 6. This configuration reduces the size of each seat track 3. Further, the interlock support portion 30 of the lock lever 22 is arranged in such a manner as to project into the outer zone S with respect to the front end 6a of the upper rail 6. This enlarges the relative pivoting range of the lock lever 22 and thus enhances the locking state maintaining function.

(3) The coil portion 34 of the torsion coil spring 33, which decreases variation of manipulation force to stabilize the manipulation force, is accommodated in each upper rail 6. The size of each seat track 3 is thus reduced. Also, the first arm portion 35 of each torsion coil spring 33 projects into the outer zone S with respect to the front end 6a of the associated upper rail 6. The elastic force produced by the first arm portion 35 of the torsion coil spring 33 is applied to the interlock support portion 32 of the corresponding handle 31 in such a direction that the interlock support portion 32 is pressed against the bottom plate 30a about the fulcrum portion 30g. When the handle 31 is manipulated in such a direction as to separate the interlock support portion 32 from the bottom plate 30a, as illustrated in FIG. 6(b), the interlock support portion 32 pivots relatively about the fulcrum portion 30g of the interlock support portion 30. This enlarges the relative pivoting range of the handle 31 and the corresponding lock lever 22.

(4) Each torsion coil spring 33 functions as a lock spring for maintaining the lock lever 22 in the locking state, in addition to an interlock spring for holding the corresponding handle 31 and the lock lever 22 with respect to each other and allowing interlocking between the handle 31 and the lock lever 22 and a retraction spring for resisting relative pivoting of the handle 31 and the lock lever 22. As a result, each seat track 3 has a decreased number of springs and is thus reduced in size.

The illustrated embodiment may be modified to be in the forms described below.

In the illustrated embodiment, each fulcrum portion 30g is arranged in the interlock support portion 30 of the associated lock lever 22 and located in the outer zone S with respect to the front end 6a of the corresponding upper rail 6. Also, the interlock support portions 30, 32, which are located between the end of each lock lever 22 and the end of the corresponding handle 31, are exposed as a whole in the outer zone S and aligned in the movement directions X of the upper rail 6 with respect to the front end 6a of the upper rail 6. Instead of this configuration, at least a part of each interlock support portion 30, 32 may be exposed in the outer zone S and aligned in the movement directions X of the upper rail 6 with respect to the front end 6a of the upper rail 6.

The coil portion 34 of each torsion coil spring 33 as a whole may be received in the accommodation chamber 16 of the corresponding upper rail 6. Alternatively, a part of the coil portion 34 may be exposed from the accommodation chamber 16 of the upper rail 6 to the exterior. In this case, the torsion coil spring 33 can be held in position by supporting the first arm portion 35 of the torsion coil spring 33 in the handle 31 and the second arm portion 36 in the upper rail 6 with the coil portion 34 arranged between the two side plates 14 in the upper rail 6.

In the illustrated embodiment, as has been described, each torsion coil spring 33 functions as the interlock spring, the retraction spring, and the lock spring. Instead of this configuration, a torsion coil spring functioning specifically as a lock spring may be employed. Alternatively, a leaf spring or a rod spring may be employed instead of each torsion coil spring 33.

In the illustrated embodiment, each pivot support portion 29 is configured by the support hole 20 of the associated side plate 14 and the corresponding projection 24 of the lock lever 22, with which the support hole 20 is pivotally engaged. However, a pivot support portion may be formed by a support hole of each side plate 14, a support hole of the lock lever 22, and a support shaft that is pivotally engaged with both support holes.

The present invention is embodied as, by way of example, a seat track slide device 1 having the handles 31 of the seat tracks 3 that are interlocked with each other. However, the invention may be used in a seat track slide device having a lock mechanism only in one of the seat tracks. In this case, the lock lever 22 and the handle 31 are provided only in one of the upper rails 6 and the lock recesses 12 are arranged only in one of the lower rails 4.

Therefore, the present examples and embodiments are to be considered as illustrative and not restrictive and the invention is not to be limited to the details given herein, but may be modified within the scope and equivalence of the appended claims.

The invention claimed is:

1. A lock mechanism for a seat track slide device that is arranged between a floor and a seat in a vehicle and selectively restricts and permits sliding of the seat, the lock mechanism comprising:
a pair of lower rails configured by a first lower rail and a second lower rail fixed to the floor;
a pair of upper rails configured by a first upper rail and a second upper rail that are fixed to the seat and supported to be movable with respect to the first lower rail and the second lower rail, respectively;
a plurality of lock portions that are formed in at least the first lower rail out of the first and second lower rails, the lock portions being aligned in a movement direction of the corresponding upper rail;
a lock member that is attached to at least the first upper rail out of the first and second upper rails, the lock member having an end;
a handle that is attached to the lock member and has an end;
an interlock support portion that is formed at the end of the lock member and supports the end of the handle;
a fulcrum portion that is arranged in the interlock support portion of the lock member and pivotally supports the handle;
the end of the handle being supported by the interlock support portion of the lock member; and
a spring supported between the first upper rail and the end of the handle,
wherein, as the handle is manipulated, the lock member is selectively engaged with and disengaged from the lock portion of at least the first lower rail,
wherein the first upper rail has an end, at least a part of the interlock support portion of the lock member being exposed in an outer zone with respect to the end of the first upper rail and extending along a movement direction of the first upper rail with respect to the end of the first upper rail, the lock member being caused to be interlocked with the handle by an elastic force produced by the spring to be selectively engaged with and disengaged from the lock portion of at least the first lower rail, and
wherein, with at least the first upper rail and at least the first lower rail being locked by the lock member, the end of the handle is allowed to pivot relative to the lock member against the elastic force of the spring about the fulcrum portion of the interlock support portion in the outer zone with respect to the end of the first upper rail.

2. The lock mechanism for a seat track slide device according to claim 1, further comprising a pivot support portion formed in the first upper rail, the lock member being inserted into the first upper rail and supported pivotally by the pivot support portion in the first upper rail, and the interlock support portion of the lock member projecting from the end of the first upper rail into the outer zone with respect to the end of the first upper rail.

3. The lock mechanism for a seat track slide device according to claim 2, wherein the spring is a torsion coil spring having a coil portion and first and second arm portions both extending from the coil portion, the first arm portion being supported by the end of the handle in the outer zone in such a manner as to project into the outer zone with respect to the end of the first upper rail, the second arm portion being supported by the first upper rail.

4. The lock mechanism for a seat track slide device according to claim 3, wherein at least a part of the coil portion of the torsion coil spring is received in the first upper rail at a position between the pivot support portion and the end of the first upper rail.

5. The lock mechanism for a seat track slide device according to claim 4, wherein the first arm portion of the coil portion is supported by the end of the handle at a position between the end of the first upper rail and the fulcrum portion of the interlock support portion of the lock member.

6. The lock mechanism for a seat track slide device according to claim 1, wherein the spring functions as an interlock spring for holding the handle and the lock member with respect to each other and interlocking the handle and the lock member with each other, a retraction spring for resisting relative pivoting of the handle and the lock member, and a lock spring for maintaining the lock member in the locking state.

7. The lock mechanism for a seat track slide device according to claim 1, wherein the first lower rail, the first upper rail, the lock member, and the handle configure a first seat track, the second lower rail, the second upper rail, an additional lock member, and an additional handle configure a second seat track, the first and second seat tracks being spaced from each other in a direction crossing the movement direction of the upper rails, the handles of the seat tracks being allowed to be interlocked with each other.

* * * * *